H. E. PRATT.
ROLLER BEARING.
APPLICATION FILED AUG. 24, 1918.

1,368,410.

Patented Feb. 15, 1921.

Inventor
Herbert E. Pratt

UNITED STATES PATENT OFFICE.

HERBERT E. PRATT, OF CHICAGO, ILLINOIS.

ROLLER-BEARING.

1,368,410.  Specification of Letters Patent.  Patented Feb. 15, 1921.

Application filed August 24, 1918. Serial No. 251,211.

*To all whom it may concern:*

Be it known that I, HERBERT E. PRATT, a citizen of the United States, residing in Chicago, county of Cook, and State of Illinois, have invented certain new and useful Improvements in Roller-Bearings, of which the following is a specification.

My invention has for its object to provide a simple form of roller bearing of general utility and application which is relatively inexpensive to manufacture, may be readily assembled and taken apart for repair, and is readily adjustable. In the accompanying drawings I have shown a preferred embodiment of the invention and have described the same in detail in the following specification. It is to be understood, however, that the specific disclosure is for the purpose of exemplification only and that the scope of the invention is defined in the following claims in which I have endeavored to distinguish it from the prior art so far as known to me without, however, relinquishing or abandoning any portion or feature thereof.

Figure 1:
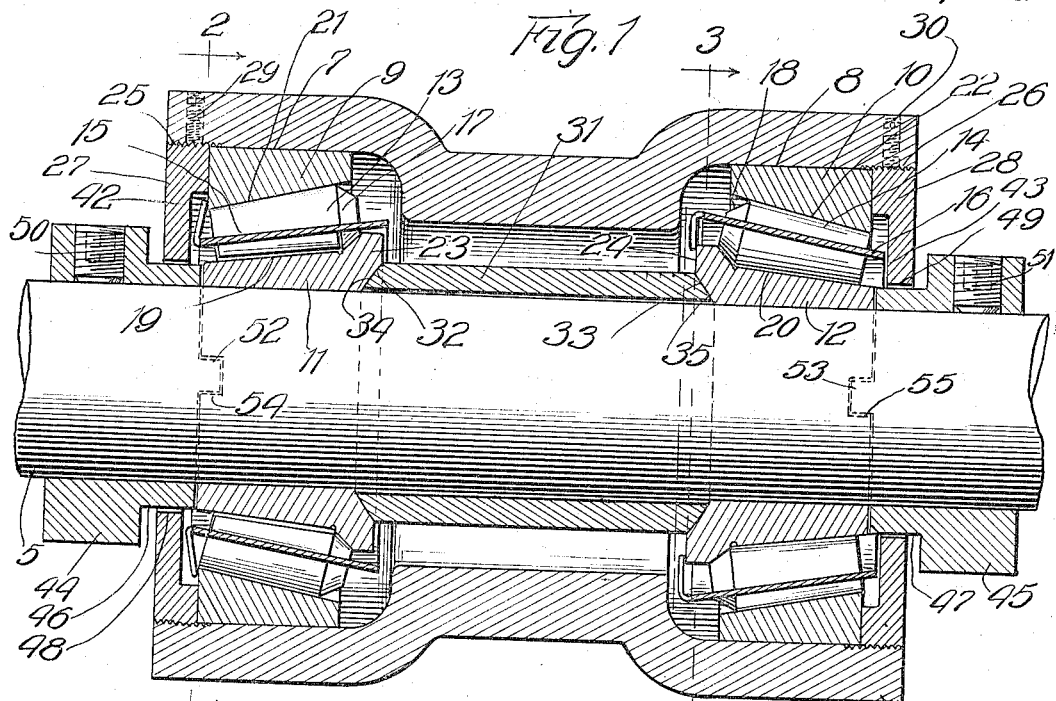
Figure 2:
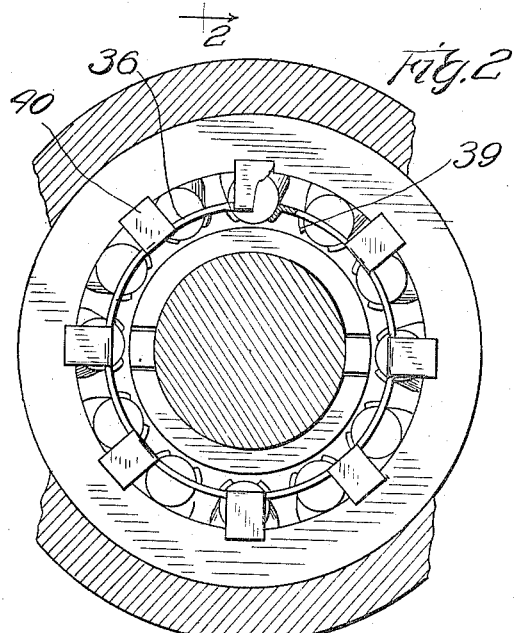
Figure 3:
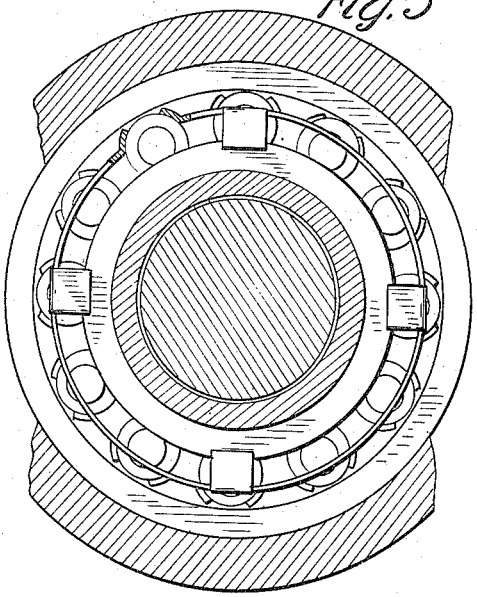

In the drawing, Figure 1 is an axial section through a preferred form of bearing embodying my invention; Fig. 2 a transverse section therethrough on the plane of the line 2—2 of Fig. 1 looking in the direction of the arrows; Fig. 3 a similar section on the line 3—3 of Fig. 1 looking in the direction of the arrows; and Fig. 4 a perspective of a detail of a modified form of the invention.

Referring first to the preferred form of the invention illustrated in the Figs. 1, 2 and 3, I have shown therein the improved bearing applied to a shaft 5 and inclosed in a housing 6, both of which elements, except in the respect hereinafter pointed out, may be of any usual or approved form. The housing is formed at its opposite ends respectively with cylindrical seats 7, 8 for the outer bearing rings, 9, 10 of the bearing, and the inner bearing rings or races 11, 12 receive the shaft in the usual manner, and fit closely thereon. The rollers 13, 14 of the respective sets are as usual, interposed between the corresponding inner and outer bearing rings and are maintained in the spaced relation by retainers 15, 16 respectively. In order to provide for the taking up of end thrust and for adjustment, the rollers 13, 14 are slightly conical as shown in Fig. 1, the larger ends of the said rollers being also chamfered as at 17, 18. The outer surfaces 19, 20 of the inner bearing rings, and the inner surfaces 21, 22 of the outer bearing rings are respectively frusto-conical, the angle of the outer bearing ring being somewhat greater than that of the inner bearing ring to allow for conicity of the rollers. The inner bearing rings are formed at their larger adjacent ends with annular ribs or flanges 23, 24, respectively, to receive the thrust from the chamfered ends of the rollers and limit the end-wise movement of the latter, with respect to said inner bearing rings. The housing is interiorly threaded as at 25, 26 at its opposite ends to receive the closure plates or disks 27, 28 which are adapted to bear against the respective outer bearing rings 9, 10 and to adjust the same. Set screws 29, 30 are provided to lock the plates or disks in adjusted position.

In order to maintain the inner rings in proper spaced relation, I provide a spacing sleeve 31, of somewhat larger internal diameter than the internal diameter of the inner rings, the ends of the sleeve being chamfered or cut away as at 32, 33, preferably on the arc of a circle to be received and bear against seats 34, 35 of similar shape formed in the adjacent ends of the respective inner bearing rings. By this construction the spacing sleeve is automatically centered, with respect to the bearing, when the parts are assembled.

The roller retainers 15, mentioned above are preferably formed from short frusto-conical sleeves of sheet metal of a form and diameter approximately corresponding to the frusto-conical surface which includes the axes of the rollers when the latter are in position in the bearing. The respective retainers are formed with roller receiving openings 36, by slitting the ring at suitable intervals parallel to its axis and circumferentially for short distances at opposite ends of the several axial slits, and bending the wings 39 so formed either downwardly or upwardly to partially embrace the respective rollers received in the openings so formed. In the retainer 15, the wings are shown as bent inwardly whereas in the retainer 16, the wings are shown as bent outwardly, the diameter of the retainer 15, being somewhat less than the diameter of the retainer 16. The wings prevent the rollers slipping out of the respective openings in which they are spaced in one direction, and it is desirable that provision be made for preventing the rollers leaving the retainer or separator ring in the other direction after they have been assembled and either before or after the bearing has been assembled as a whole. For this purpose when the retainer is formed with inwardly bent wings I lock it to the outer bearing ring so that it will not accidentally separate therefrom, and on the other hand when the wings are bent outwardly, I lock the retainer to the inner bearing ring. The retainer 15, is therefore shown as locked to the outer ring, and for this purpose is formed upon its end of smaller diameter with the lugs 40 which, when the parts are assembled are bent outwardly to engage the outer face of the outer bearing ring 9, see Figs. 1 and 2, to prevent inward movement of the retainer and rollers with respect to said bearing ring. Obviously, the inclination of the inner surface of the bearing ring coöperating with the rollers prevents relative movement in the opposite direction. The retaining ring 16, the wings of which are bent outwardly, is formed at its larger end with the lugs or tongues 41, which are bent inwardly to engage the enlarged end of the corresponding inner bearing ring to prevent outward longitudinal movement of the rollers and retainer with respect to said ring, movement in the other direction being limited by engagement with the frusto-conical surface of the ring with the rollers. In either of these constructions, obviously, the rollers and retainer are prevented from being disassociated from the bearing ring to which the retainer is locked. As seen in Fig. 1 the disks 27 and 28 are cut away as at 42, 43 to permit the free movement of the respective retainers.

The bearing is locked to the shaft in the desired position by means of collars 44, 45 which are reduced as at 46, 47 to extend through axial openings 48, 49 in the respective disks and into contact with the outer ends of bearing rings 11, 12 respectively. The collars are locked to the shaft by set screws 50, 51 respectively and are formed on their inner ends with lugs or keys 52, 53 respectively which engage corresponding notches 54, 55 in the respective inner rings 11, 12 so that the latter are positively driven from the shaft and rotation with respect to the latter is prevented.

Figure 4:
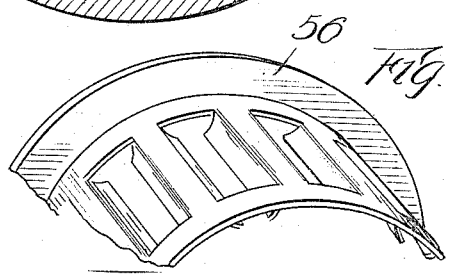

In Fig. 4 I have shown a modification of the retainer ring the difference from those described consisting only in that a flange 56 is spun or otherwise formed upon the end of the ring instead of locking lugs of the form of invention previously described. This flange must, of course, be formed after the retainer and rollers have been assembled with the bearing ring as above described.

The improved bearing can be assembled by assembling the respective sets of rollers with their bearing rings in the housing with the spacing sleeve between them, and adjusting the disks 27, 28 into close contact with the respective outer bearing rings. In this condition, the bearing may be shipped along with the collars for locking it on the shaft. It is necessary for setting up the bearing merely to apply it to the shaft, and lock it in position between the collars.

I claim:

1. A roller bearing of the class described, comprising a pair of oppositely tapered inner bearing rings, a spacing sleeve mounted between said rings, abutting against them and having angular movement with respect thereto, means for adjusting the rings into contact with said spacing sleeve, rollers, outer bearing rings coöperating with the rollers and the respective inner bearing rings, and a housing.

2. In a device of the class described, a pair of oppositely tapered inner bearing rings the adjacent ends of which are cut away, a spacing sleeve of slightly larger internal diameter than said rings having its ends tapered to correspond to the recesses in the ends of the rings and entering said recesses, means to adjust the bearing rings toward each other, a set of rollers for each bearing ring, an outer bearing ring for each set of rollers, and a housing.

3. In a device of the class described, a pair of inner bearing rings, an intermediate spacing sleeve the ends of which are tapered upon a curve and the interior diameter of which is slightly larger than the interior diameter of said rings, means for adjusting said rings toward each other, means for keying the rings to the adjusting means to prevent their rotation relative to the shaft, a set of rollers for each said ring, an outer bearing ring for each set of rollers, and a housing.

4. In a device of the class described, a pair of inner bearing rings, a spacing sleeve intermediate said rings, a set of rollers for each said ring, an outer bearing ring for each set of rollers, a housing inclosing said rings and rollers, a disk closing each end of the housing, a collar extending through each disk and in contact with the adjacent inner bearing ring and means for locking the collar to the shaft.

5. In a device of the class described, a housing, a pair of inner bearing rings having oppositely inclined frusto-conical bearing surfaces mounted in the housing, a shaft carried by said inner rings, a spacing sleeve of larger internal diameter than the shaft and supported out of contact therewith by said bearing rings, a series of rollers for each said ring, an outer bearing ring surrounding each set of rollers, a disk screwed into each end of the housing and bearing upon the adjacent outer bearing ring and collars extending through the respective disks and having means for securing them to the shaft.

6. In a device of the class described, a housing and outer bearing rings adjustably seated in respective opposite ends of the housing and having frusto-conical roller bearing surfaces, means for axially adjusting said rings in the housing, inner bearing rings coöperating with the respective bearing rings in the housing, and adapted to be mounted upon a shaft also having frusto-conical bearing surfaces, a series of rollers mounted between each outer bearing ring and its coöperating inner bearing ring, and a spacing sleeve intermediate the inner bearing rings supported thereby and spacing said inner rings apart.

HERBERT E. PRATT.